G. A. BLANCHARD.
Churn.
No. 204,418. Patented June 4, 1878.
Fig. 1.
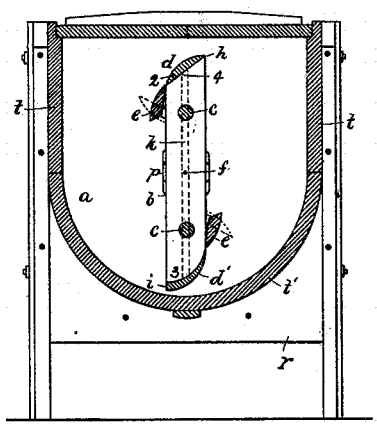
Fig. 2.     Fig. 4.     Fig. 3.
 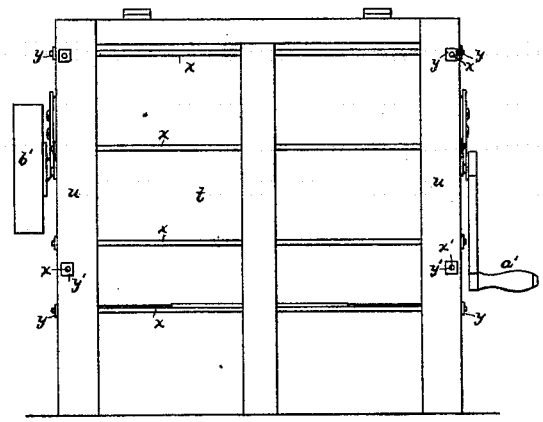 
Fig. 5.     Fig. 6.
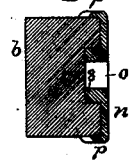 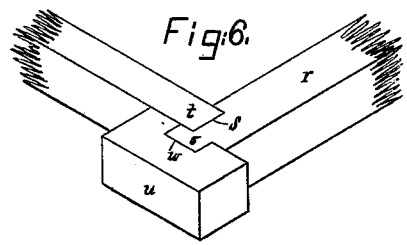
Witnesses.
E. C. Perkins.
W. J. Pratt.
Inventor.
George. A. Blanchard,
by Crosby Gregory, Attys

UNITED STATES PATENT OFFICE.

GEORGE A. BLANCHARD, OF CONCORD, NEW HAMPSHIRE.

IMPROVEMENT IN CHURNS.

Specification forming part of Letters Patent No. 204,418, dated June 4, 1878; application filed October 18, 1877.

*To all whom it may concern:*

Be it known that I, GEORGE A. BLANCHARD, of Concord, in the county of Merrimack and State of New Hampshire, have invented an Improved Churn, of which the following is a specification:

This invention relates to churns of that class wherein the dasher, having a horizontal axle, has a motion of rotation when churning, and is especially an improvement upon the well-known Blanchard churn. In that churn the outermost horizontal dasher-blades are convex externally and concaved internally.

In the process of churning, when the butter-globules begin to separate from the cream, they are apt to collect upon the concaved side of such a dasher, and gradually, and oftentimes very quickly, collecting, according to the condition of the cream, such particles form in masses sufficiently large to partially choke the opening between and prevent the passage of the forming butter between the blade and float. Such partially-formed butter then rotated with the dasher retards the butter-forming process and makes the butter less even as to color and texture, and of inferior quality.

The object of this invention is to so improve the construction of the Blanchard churn that the cream and partially-formed butter shall have no place in which to become lodged or stopped, but shall move freely from the blades of the dasher, leaving them unclogged and unobstructed, thereby permitting the blades to operate evenly upon all the cream to produce butter of uniform color and quality.

This invention consists, primarily, in dispensing with the concave at the inner surface of the blades of the Blanchard churn, so that the cream and butter-forming particles have no tendency to be caught and held on the blades.

Figure 1 shows, in section, the body portion and dasher of a Blanchard churn, one blade of the dasher being made in accordance with my invention and the other in the ordinary way; Figs. 2 and 3, modified forms thereof; Fig. 4, a side view of the churn; Fig. 5, its crank-receiving plate and a cross-section through one arm of the dasher, and Fig. 6 a detail of the corner-joint between the side and end portions and corner-posts of the churn.

The cream to be churned is placed in the part $a$. The dasher is composed of side arms $b$, connected by cross-rods $c$. The arms carry at their ends blades $d$ $d'$, and at their sides they have pivoted floats $e$. The floats $e$ $e$ operate in the present churn as in the ordinary Blanchard churn, and they need not, therefore, be herein described further than to say that when in operation they stand as shown in the drawings in dotted lines, and when the butter is being worked they stand as in full lines. The center of motion of the dasher is at $f$.

The old form of dasher-blade is shown at $d'$ in order that its construction may be compared with the new form, represented at $d$, it being understood that in practice both blades will be made as shown at $d$. The outer portions of the new blades will be made convex, as at 2.

My improved blade is made straight on its inner face, as at 4, rather than convexed, as at 3, the cream passing freely over such straight face without clogging or remaining in contact therewith, as in the case of the concave blade of the old form of dasher.

The inner face of the blade, instead of being exactly straight, might be made as shown in Fig. 2, or as shown in Fig. 3; but I prefer the shape shown at 4—viz., straight.

A dasher in which the inner face of the blade is not concaved will permit the forming butter-globules to pass readily and freely between the blade and float and be churned evenly.

By making the edge thin, as at $h$, rather than thick, as at $i$, (the old plan,) the dasher may be more easily rotated, which is a matter of much importance when the cream is quite stiff.

To agitate all parts of the cream, and specially that between the outer faces of the side arms or ends of the dasher and the ends of the churn, I apply to each outer end of the dasher, at one or both sides of its center, a ledge or projection, $k$, (see dotted lines, Fig. 1,) preferably of wood, it filling substantially the space between the ends of the dasher and the ends of the churn. These ledges may be fixed, or be supported in a yielding manner, so that they will act to bear upon and scrape the cream from the ends of the churn and keep all the cream in agitation. One of the side arms of the dasher in the usual Blanchard churn is provided with a recess to receive a metal plate, having an opening for the crank by which the dasher is rotated. The force exerted to rotate the dasher is sometimes sufficient to cause this metal plate to split the side arm. To obviate this and make the plate assist to strengthen rather than weaken the side arm, I have provided it with ears or flanges to embrace the edges of the arm. This improved crank-receiving plate $n$ has a socket, $o$, for the reception of the crank of the shaft, ears $p$ to fit the edges of the arm, and a central hub, 8, to fit a hole in the arm.

It is a great desideratum to so join the end and side portions of the churn that the wood will not crack or become loose, causing the churn to leak, as the wood, which is sometimes very wet and sometimes very dry, swells and shrinks. To secure this end I have grooved the end portions $r$ of the churn, as at $s$, to receive the vertical and curved portions composing the sides and bottom $t$ of the churn, and thus form a water-tight joint. When the churn is in use, and therefore very wet, the sides and ends all expand together in their grooves. If the joints should open when the churn becomes dry, they may be driven together again, so as to be perfectly tight.

To prevent the end pieces moving in the direction of the axis of the dasher, I have grooved the corner-posts $u$, as at $w$, to receive the tenon 5, one at each end of the end piece. These corner-posts are held together by rods $x$ $x'$ provided with tightening-nuts $y$ $y'$. The handle $a'$ and pulley $b'$ are as usual.

I claim—

As a new article of manufacture, a rotating churn-dasher provided with pivoted floats, and with blades having convexed outer faces and inner faces, shaped substantially as shown and described, whereby the cream is permitted to pass freely over the blades without clogging, so as to make butter of uniform color and quality, all substantially as described.

In testimony whereof I have signed my name to this specification in the presence of two subscribing witnesses.

GEO. A. BLANCHARD.

Witnesses:
G. W. GREGORY,
W. J. PRATT.